(No Model.) 2 Sheets—Sheet 1.
F. P. ERCK & E. J. ANDERSON.
LEMON SQUEEZER.
No. 462,429. Patented Nov. 3, 1891.
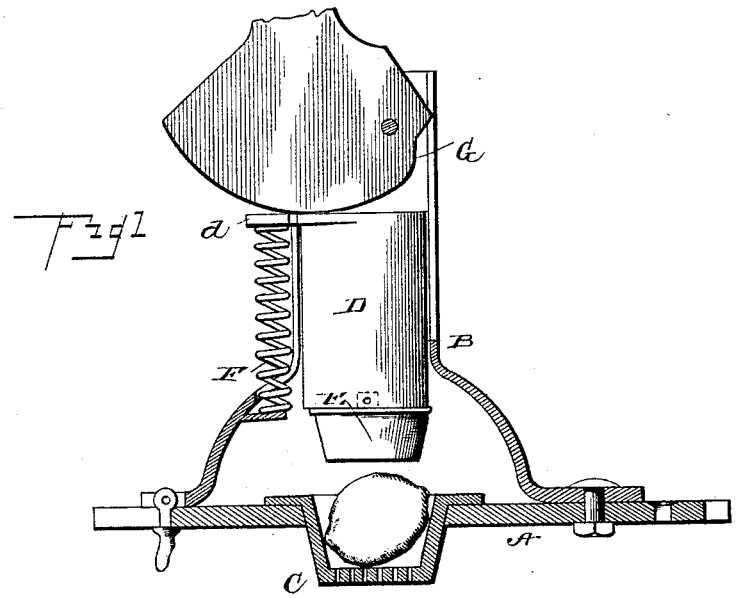
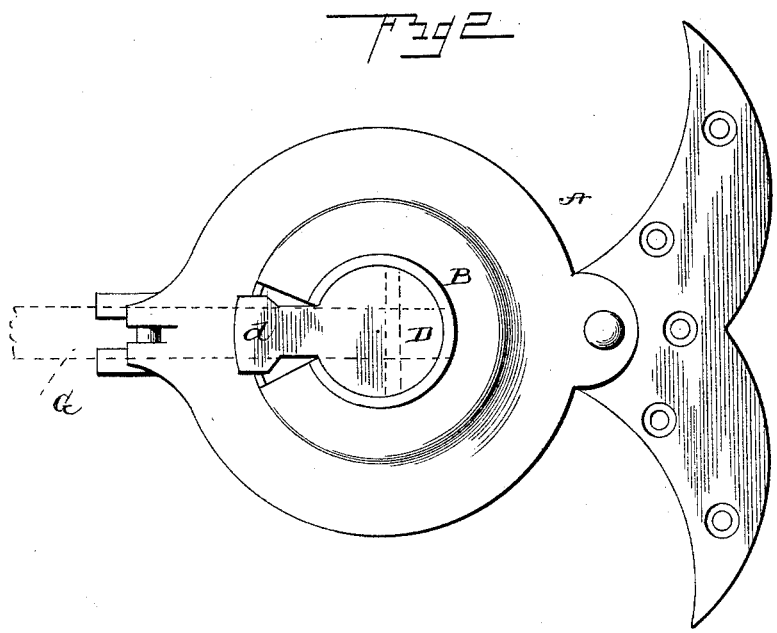
WITNESSES:
John Tourie
M. L. Gibbs
INVENTORS
Franklin Pearce Erck
Edward J. Anderson
BY
J. H. L. Gibbs
their ATTORNEY.

(No Model.) 2 Sheets—Sheet 2.
F. P. ERCK & E. J. ANDERSON.
LEMON SQUEEZER.
No. 462,429. Patented Nov. 3, 1891.
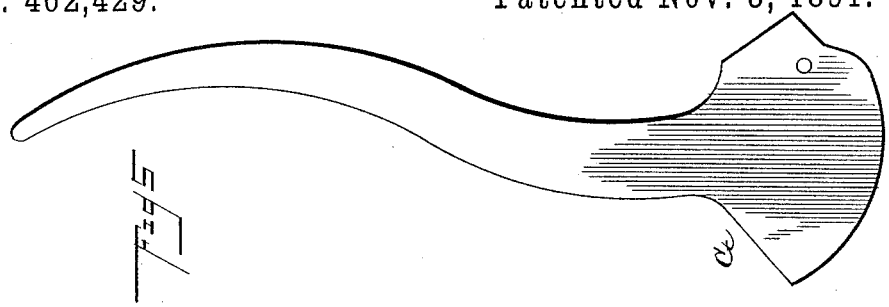
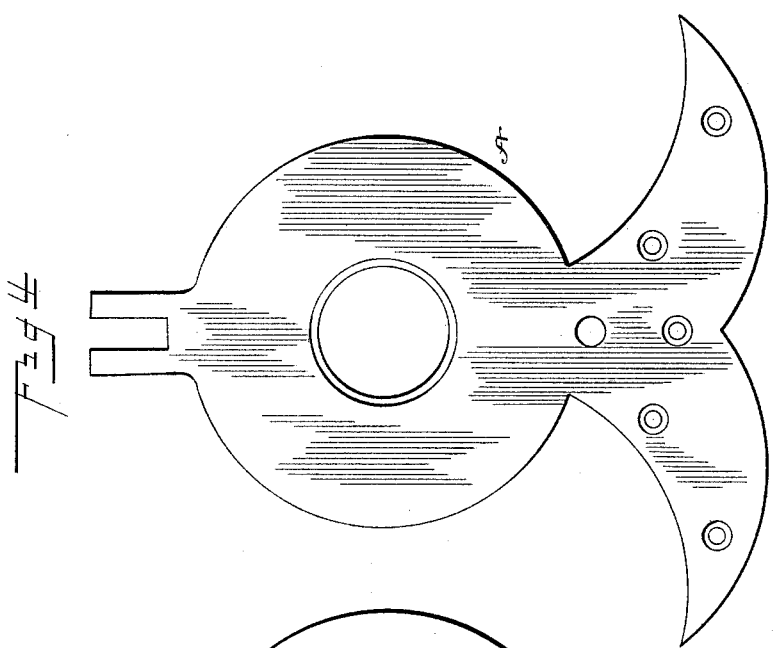
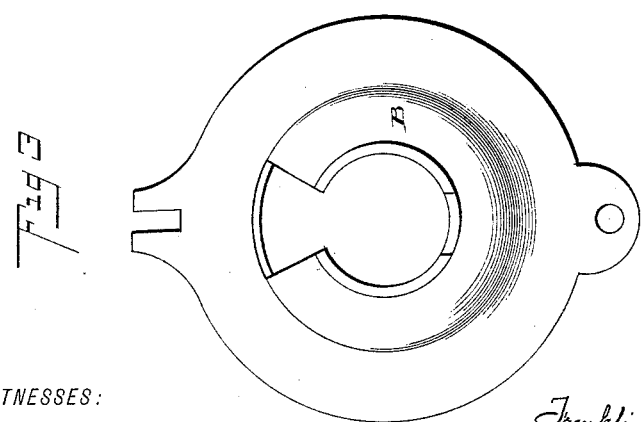
WITNESSES:
John Tamine
M. L. Gibbs
INVENTORS
Franklin Pearce Erck
Edward J. Anderson
BY F. H. C. Gibbs
their ATTORNEY.

UNITED STATES PATENT OFFICE.

FRANKLIN PEARCE ERCK AND EDWARD J. ANDERSON, OF LOUISVILLE, KENTUCKY.

LEMON-SQUEEZER.

SPECIFICATION forming part of Letters Patent No. 462,429, dated November 3, 1891.

Application filed March 13, 1891. Serial No. 384,861. (No model.)

*To all whom it may concern:*

Be it known that we, FRANKLIN PEARCE ERCK and EDWARD J. ANDERSON, of Louisville, in the county of Jefferson and State of Kentucky, have invented new and useful Improvements in Lemon-Squeezers, of which the following, taken in connection with the accompanying drawings, is a full, clear, and exact description.

This invention relates to improvements in squeezers, and is used more particularly to express the juice from lemons and kindred fruits; and it consists in certain peculiarities hereinafter more fully described, and particularly pointed out in the claim.

In the accompanying drawings like letters of reference indicate corresponding parts in all the views, wherein—

Figure 1 is a side elevation, partly in section. Fig. 2 is a top plan view. Fig. 3 is a top plan view of the top plate and standard, hereinafter referred to. Fig. 4 is a plan view of the securing-plate, upon which rests the standard; and Fig. 5 shows the operating-cam in a detached view.

In this class of devices it is essential to secure a considerable degree of pressure upon the fruit to thoroughly express therefrom all its juice, and it is desirable that such pressure should be even and easily regulated by the operator.

In our invention we employ the base-plate A, which is firmly secured to any suitable table or stand, and to the base-plate we pivotally secure the standard B, in which is the operative mechanism of our device. The base-plate A is provided with a central opening in which rests the holding-cup C, into which is put the fruit from which it is desired to express the juice. Having placed the fruit in the cup, the standard is moved to a position vertically above the base-plate and there securely locked in any suitable manner, though we prefer to employ a lock which consists simply of a downwardly-projecting piece of metal to catch into a slot cut into the face of the base-plate and to which piece of metal is secured a handle to assist in moving the standard to and from its operative position; or said handle may be of the same piece as the catch and consist merely of an extension of the same, as may be desired. Having placed the fruit in the holding-cup and locked the standard in its operative position, all that is necessary is a downward movement of the cam-lever G, which causes the plunger D, with its extension E, to press against the fruit and force the same into the cup with sufficient force to express all the juice contained therein, which juice will then pass through the perforations provided for the purpose and into the receptacle set under said cup. The base-plate is preferably made of metal and of sufficient strength to withstand the strain incident to continual use of the squeezer. The form of the base-plate is immaterial, though the form shown in the drawings is the one which we prefer to use in practice. What is required is a suitable base provided with an opening, into which may be set the fruit-holding cup and to which the standard may be attached in such manner as to be readily removable for operation. The cup is preferably formed from glass and provided with openings large enough to permit easy escape of juices therefrom. The standard B is formed hollow and sufficiently large to inclose the plunger D and the spring F, which returns the plunger to its normal position when pressure is released from the lever G. The said lever is pivoted in the upper end of the standard B with its cam-face extending downward, so that pressure is applied to the free end of the said lever. The cam-face will bear against the upper end of the plunger D and its extension $d$ and force them downward. The standard is formed bell-shaped at its lower end to permit the plunger with its enlarged end rising into the bell-shaped lower end and thus be sufficiently elevated to clear any fruit placed in the cup C. The casting is left open at its sides at and near the top portion, so as to permit the cam-lever being pivoted in the upper end of said standard and have sufficient clearance to operate freely in its up-and-down movement and to carry with it the extension $d$ and the spring F, which returns the plunger to its normal position.

Having described our invention, what we claim as new, and desire to secure by Letters Patent, is—

In a lemon-squeezer, the combination of a cup-holding base-plate, a standard pivotally secured thereto, so as to be removable at will, a lock for holding together the base-plate and standard, a vertically-reciprocating plunger supported in said standard by means of a spring bearing against a lateral extension projecting from said plunger at or near the top of the same, and a cam-lever pivoted in said standard in such manner that a downstroke of the free end of said cam-lever will cause a corresponding downstroke of the piston held in said standard.

In testimony whereof we have hereunto signed our names, in the presence of two attesting witnesses, at Louisville, in the county of Jefferson, in the State of Kentucky, this 16th day of February, 1890.

FRANKLIN PEARCE ERCK.
EDWARD J. ANDERSON.

Witnesses:
FREDERICK H. GIBBS,
M. L. GIBBS.